Feb. 26, 1924.
G. W. BURT ET AL
1,485,070
APPARATUS FOR THE TREATMENT OF MATERIALS
Filed May 19, 1919
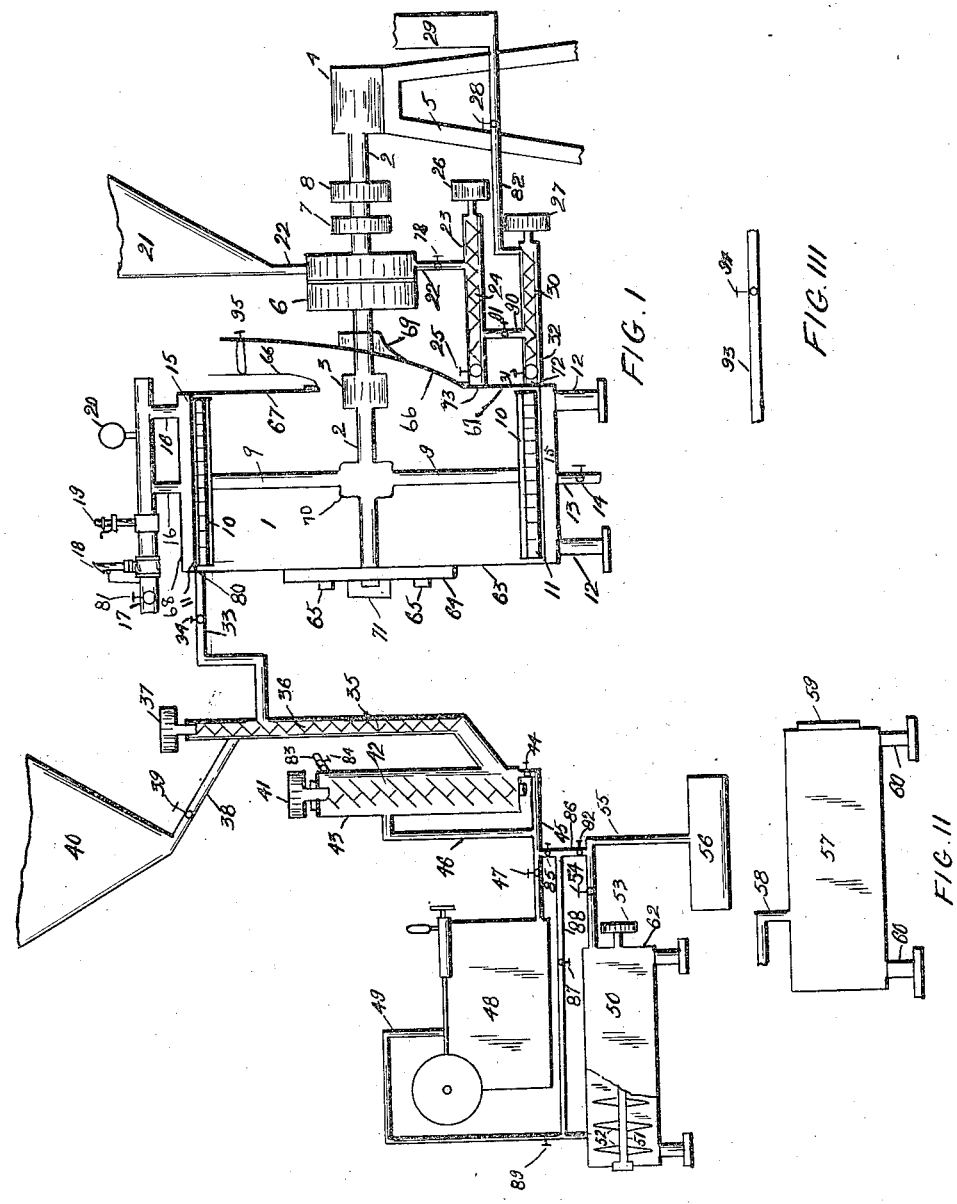
WITNESSES
M. L. Mabee
H. Koester
INVENTORS
George W. Burt
BY Charles R. Mabee
C. R. Mabee
ATTORNEYS.

Patented Feb. 26, 1924.

1,485,070

UNITED STATES PATENT OFFICE.

GEORGE W. BURT, OF PORTLAND, OREGON, AND CHARLES R. MABEE, OF TORONTO, ONTARIO, CANADA; SAID MABEE ASSIGNOR OF HIS ENTIRE INTEREST TO MABEE PATENTS CORPORATION, OF DOVER, DELAWARE.

APPARATUS FOR THE TREATMENT OF MATERIALS.

Application filed May 19, 1919. Serial No. 298,317.

*To all whom it may concern:*

Be it known that we, GEORGE W. BURT, of the city of Portland, county of Multnomah, and State of Oregon, and CHARLES R. MA-BEE, of the city of Toronto, county of York, Province of Ontario, Canada, have invented certain new and useful Improvements in Apparatus for the Treatment of Materials, of which the following is a clear specification.
This invention relates to apparatus for the combining of milk, sugar and other substances and to the treatment of milk, sugar and other substances in the production of food products.
Briefly stated, the invention involves the use of an evaporator with special means for introducing materials therein and thereafter reducing their volume by evaporation, and other treatment to prepare them and preserve them for the market. In certain instances, the substances may be sugared and otherwise treated after being subjected to treatment to remove a portion of the moisture by evaporation.
The invention also involves, in certain cases, the homogenization, cooling and sterilization of the products to be treated, although any of the steps may be omitted in special cases.
In the manufacture of sugared condensed milk, in the preparation of ice cream and confection mixes, and in the treatment of tomato products to prepare them for catsup, and the like, it is necessary to combine other products with sugar, tomatoes, milk, and other food substances, and the apparatus about to be described will enable certain processes to be carried out, which in so far as we have been able to ascertain, have not been utilized.

In the accompanying drawings,
Fig. 1 is a diagrammatic view in side elevation of our improved apparatus.
Fig. 2 is a conventional showing in side elevation of the sterilizer.
Fig. 3 is a fragmentary view of a valve controlled pipe for alternative use.
Referring to the drawings, 1 is a cylindrical container closed at one end by the plate 63 to which is attached the removable casting 64 provided with the peep holes shown at 65, and partly closed at the opposite end by the plate 67 to which is firmly attached the offtake pipe shown at 66.

The cylindrical container 1 has an outer wall shown at 11 surrounded by a jacket shown at 15 the outer wall of which is shown at 68 connected by the pipes 16 with the pipe 17 which is provided with a regulating valve shown at 81, a pressure regulator at 18 and a safety valve shown at 19 and a pressure indicator shown at 20.

The cylindrical container 1 is provided with a central shaft shown at 2 mounted upon the bearing shown at 3, 4, 69, and 71. The central shaft passes through the end plate 63 to which is attached the guide bearing 71. The shaft 2 also passes through the offtake casting 66 to which is attached the bearing 69 and at its rear extremity the shaft 2 is mounted upon the bearing 4 which is suitably attached to the support shown at 5.

Upon the shaft 2 is mounted the pulleys shown at 6, 7 and 8. The shaft 2 is rotated by means of the pulley shown at 6.

Mounted upon the shaft 2 is the casting 70 the outer portion of which is shown at 9 and has firmly attached the conveyor blades shown at 10.

The end plate 67 is provided with the orifice 72 with which is connected the pipe 32 provided with the valve 31. Within the pipe 32 conveyor means are provided shown at 30, and to which conveyor means the pulley 27 is firmly attached for rotation. At the outer extremity of the pipe 32 is connected the pipe 82, provided with the valve 28 and at its outer end the pipe 82 is connected with the vat 29.

The end plate 67 is provided with the orifice 73, to which is connected the pipe 23, provided with the valve 25. The pipe 23 is provided internally with conveyor means shown at 24 and at the outer end the conveyor means is connected with the pulley 26 adapted for rotation.

The pipe 23 is connected by the pipe 22 with the hopper 21 and in the pipe 22 a regulating valve is shown at 78. The pulley 7 is in line with the pulley 27 and the pulley 8 is in line with the pulley 26.

The cylindrical container 1 is connected by the pipe 33 with the pipe shown at 35 which is provided internally with conveyor means shown at 36. The pipe 33 is provided with the regulating valve 34 and is connected with the cylindrical container 1 at the orifice 80 which is substantially on the plane of the concave surface of the cylinder shown at 11.

The conveyor means shown at 36, situated within the pipe 35, is connected at its upper extremity with the pulley 37 adapted for rotation. The pipe 38, provided with the regulating valve 39, connects the hopper 40 with the pipe 35.

At its lower extremity the pipe 35 is connected with the mixing chamber 43 which is provided internally with the agitator shown at 42 to the upper extremity of which is attached the pulley 41 adapted for rotation.

The mixing chamber 43 is provided with the offtake pipe 46 connected with the pipe 45. The pipe 45 is provided with two regulating valves shown at 44 and 47 and connected with the mixing chamber 43 and the homogenizer shown at 48.

The pipe 49 connects the homogenizer 48 with the cooler 50, which is provided with the central shaft shown at 51 upon which is mounted the discs shown at 52 suitably provided for the introduction therein of a cooling medium.

The shaft 51 of the cooler 50 passes through the end wall 62 and is provided at its outer extremity with the pulley 53 adapted for rotation. The pipe 55 provided with the valve 54 connects the cooler 50 with a reservoir adapted to receive the materials cooled and shown at 56.

At 57 is conventionally shown a sterilizer supported by the legs shown at 60, the steam inlet shown at 58 and a door shown at 59. At 93 is shown a pipe provided with a regulating valve 94 which in alternative construction may be attached at either end with the orifice 72 in the end plate 67.

In practicing our invention when power has been applied to the shaft 2 through the pulley 6 the valves 28 in pipe 16 and 31 in pipe 32 are opened to permit liquid materials, milk for example to flow from the vat 29 into the conveyor means shown at 30 and through the orifice 72 into the cylindrical container 1. Power is applied to the conveyor means shown at 30 through suitable transmission between the pulleys 7 and 27. Simultaneously with the opening of the valves 28 and 31, the valves 78 and 25 are opened in the pipes 22 and 23 to permit solid materials, sugar for example to flow from the hopper 21 into the conveyor means shown at 24 and which conveyor means is set in motion through the transmission of power by suitable connections between the pulley 8 and 26. The solid materials enter the cylindrical container 1 through the orifice 73, or the valve 25 may be closed and the valve 91 in the intercommunicating pipe 90 may be opened and the dry materials forced into pipe 32.

Simultaneously with the rotation of the shaft 2 and the introduction of materials through the orifices 72 and 73 the heating medium is introduced into the jacket 15 through the opening of the valve shown at 81 in the pipe 17 which is connected by the pipes shown at 16 with the jacket shown at 68.

The materials introduced are immediately spread over the concave surface of the cylindrical container 1 by the application of centrifugal force and circumferential motion through the rotation of the conveyor blades attached to the shaft 2 through the casting 70 the peripheral portion of which is shown at 9.

The conveyor blades 10 travel in close proximity at their outer extremity to the concave surface of the cylinder 11, and as the shaft 2 in practice is rotated from 260 to 300 times per minute, the materials to be treated are actively moved over and against the heated treating surface of the cylinder 11 and pass out of the cylindrical container 1 through the orifice 80 into the pipe 33 and therefrom into the pipe 35.

In cases where it is desirable to combine solid and liquid materials or liquid materials combined with solid materials, after the liquid materials have been reduced in volume by evaporation of moisture content therefrom in the cylinder 1, the solid materials yet to be added can be combined with the condensed residue by the opening of the valve 39 in pipe 38 which connects the solid material hopper 40 with the pipe 35 provided internally with the conveyor means shown at 36.

In instances where the solid and liquid materials are introduced into the cylindrical container 1 through the orifices 72 and 73, and reduced in volume by evaporization the residue passes out of the evaporating chamber through pipe 33, into pipe 35 and is permitted to flow into the mixing chamber 43 and thereout through the valve 44 which is opened, and into the pipe 45 into the homogenizer 48, in which case the valve 47 is also opened.

In instances where solid materials are to be introduced into the pipe 35 the solid materials are conveyed with the liquid containing materials to the lower extremity of the pipe 35, and pass through the lower extremity of pipe 35 by gravity into the mixer 43 which is provided with agitating means shown at 42 for mixing and blending the solid and liquid materials. In this instance the valve 44 is closed and the materials flow out of the mixer 43 through the pipe 46, which acts as an overflow pipe to permit the materials in solution to pass into the pipe 45.

The materials may pass from the mixing chamber 43 into the homogenizer 48 through the pipe 45, in which case the valve 47 is opened and the valve 85 in pipe 86 is closed and also the valve 44 in pipe 45 is closed, in order that all of the materials passing out of the mixer 43 are thoroughly blended to enable the moisture in the materials to absorb the soluble solids and render them in solution.

The materials pass out of the homogenizer through the pipe 49 guarded by the valve 89, which is opened and into the cooler 50. In this instance the valve 87 in pipe 88 is closed. The materials pass lengthwise of the cooler leaving it through the pipe 55, the valve 54 being opened, and may be introduced into any suitable container such as shown at 56.

In some uses of the apparatus the homogenizing step may be eliminated and the materials from the mixing chamber 43 may pass through the pipe 46 into the pipe 45, then by closing the valves 44 and 47, into the pipe 86 in which case the valve 85 is opened and the valve 92 is closed, diverting the flow into pipe 88 and, the valve 87 being opened the materials flow into the cooler 50.

Where the homogenizing step is eliminated the valve 89 in the pipe 49 leading between the homogenizer 48 and the cooler 50 is closed. Likewise the valve 47 in pipe 45 is closed. The materials after passing lengthwise of the cooler may be conveyed to any container through the pipe 55 provided with the valve 54 which is open.

Again, where the dry and liquid materials are combined before being reduced in volume by evaporation, the materials may flow from the evaporator 1 through the pipe 33, through the mixing pipe 35, through the valve 44 and pipe 45 to the connection with the pipe 86, in which case the valve 47 in pipe 45 is closed. The valve 87 in pipe 88 is also closed and the valve 92 in pipe 86 is opened and the valve 54 in pipe 55 is closed to divert the flow from pipe 86 through pipe 55 to any suitable container as shown at 56.

The materials may be sterilized whether homogenized or not and whether cooled or not, and regardless of whether the dry and liquid materials were wholly or partly combined before the evaporation treatment or afterwards, and regardless of whether the dry and liquid materials entered the evaporator through one orifice or through two orifices.

In the manufacture of sugared condensed milk and other materials such as ice cream mixes, it is necessary to treat the materials in a manner by which the soluble materials are wholly taken up in solution by the liquid materials, and in a manner to maintain the soluble materials in solution, and to prevent them from again crystalizing or separating, and the means here provided to accomplish these results in so far as we have been able to ascertain have not previously been employed.

This invention may be conveniently adapted to the manufacture of ice cream, confection, and other mixes, wherein a number of ingredients, some dry and some liquid, may be brought together either before or after the evaporating step, or they may be combined within the evaporating chamber.

What we claim is:

1. In apparatus for treating materials, the combination of a cylindrical container closed at one end and partially closed at the other end, means for introducing dry materials into the container in a uniform manner, means for introducing liquid materials into the container in a uniform manner, means for heating the walls of the container, means for spreading the materials over the concave surface of the heated walls, means for moving the materials circumferentially and spirally over the concave walls of the container, means for permitting the vapor to escape from the container under pressure exceeding that of the atmosphere, and means for permitting the materials treated to escape continuously from the container.

2. In apparatus of the character described, the combination of a cylindrical container, screw conveyor means connected to an orifice in the end of the cylindrical container, a hopper for dry materials connected with said screw conveyor, a second screw conveyor means connected with an orifice in the cylindrical container, a vat with pipe connections to the second screw conveyor, means for controlling the introduction of materials from the screw conveyor means connected with the hopper and the vat into the cylindrical container, means for spreading the materials over the concave surface of the container, means for heating the container, means for permitting vapor to escape from the container, and means for allowing the materials to escape from the container.

3. In apparatus of the character described, the combination of a cylindrical container, a screw conveyor having a discharge connection with the container, a hopper, a connection leading from the hopper to the screw conveyor, a second screw conveyor having a discharge connection with the said container, a vat, a connection from said vat to the second conveyor, means for distributing materials over the concave surface of the container, means for moving the materials spirally and circumferentially over said concave surface, means for heating the materials in the container, means for permitting vapor to escape from the container, and means for permitting the treated materials to escape from the concave surface of the container.

4. In apparatus of the character described, the combination of a cylindrical container, a positively acting conveyor means having a discharge connection with said container, means for delivering dry and liquid materials to said conveyor, means within the container for applying centrifugal force and circumferential motion to the materials introduced therein to spread them over the concave surface of the container, means for heating the materials in the container, means for permitting vapor to escape from the container, and means of permitting treated materials to escape from the container.

5. In apparatus of the character described, the combination of a cylinder container, means for introducing solid and liquid materials into said container in a positive and uniform manner, means for mixing the materials introduced into the container and spreading them over the concave surface thereof, means for heating the materials in the container, means for permitting the vapor to escape from the materials and the container, and means for permitting the materials to escape from the concave surface.

6. In apparatus of the character described, the combination of a cylindrical container, means for introducing materials in the container through a plurality of orifices, means for spreading the materials over the concave surface of the container, means for heating the materials in the container, means for permitting the vapor to escape from the materials and from the container, and means for permitting the materials to continuously escape from the concave surface of the container.

7. In apparatus of the character described, the combination of a cylindrical container, means for introducing dry and liquid materials in a positive and continuous manner into said container, means in the container for applying force and motion to the materials to spread them over the concave surface of the container, means for heating the materials, means for permitting the vapor to escape therefrom, and from the container, means for regulating pressure within the container, and means for permitting the materials to escape therefrom.

8. In apparatus of the character described, the combination of a cylindrical container, positive feeding means for introducing dry and liquid materials therein, means for spreading the materials over the concave surface of the container, means for permitting vapor to escape from the materials and the container, means for heating the materials in the container, and means for permitting the materials to escape therefrom.

9. In apparatus of the character described, the combination of a cylindrical container, means for introducing dry and liquid materials therein in a continuous, uniform and positive manner, means for heating the materials in the container, means for spreading the materials and moving them over the concave surface of the container, means for permitting the vapor to escape from the materials and from the container, and means for permitting the materials to escape from the container.

GEORGE W. BURT.
CHARLES R. MABEE.

Witnesses:
W. T. Du Bois,
Guy G. Shonkwiler.